US008239363B2

(12) United States Patent
Borton et al.

(10) Patent No.: US 8,239,363 B2
(45) Date of Patent: Aug. 7, 2012

(54) QUERY CONTEXT SELECTION USING GRAPHICAL PROPERTIES

(75) Inventors: Scott Andrew Borton, Seattle, WA (US); Carlos Manuel Casanova, Jr., Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 260 days.

(21) Appl. No.: 12/814,225

(22) Filed: Jun. 11, 2010

(65) Prior Publication Data

US 2011/0307461 A1    Dec. 15, 2011

(51) Int. Cl.
*G06F 17/30* (2006.01)
(52) U.S. Cl. ........ 707/706; 707/755; 707/723; 707/780; 707/713; 707/737; 707/793
(58) Field of Classification Search .................. 707/755, 707/723, 780, 713, 793, 737, 706
See application file for complete search history.

(56) References Cited

U.S. PATENT DOCUMENTS

| 6,374,275 | B2  |   | 4/2002  | Wasilewski |          |
|-----------|-----|---|---------|------------|----------|
| 7,644,101 | B2  | * | 1/2010  | Yano       | 707/793  |
| 7,974,967 | B2  | * | 7/2011  | Scheuermann| 707/713  |
| 2003/0220917 | A1 |  | 11/2003 | Copperman et al. | |
| 2005/0216446 | A1 |  | 9/2005  | Hall       |          |
| 2006/0036659 | A1 |  | 2/2006  | Capriati et al. | |
| 2006/0271520 | A1 |  | 11/2006 | Ragan      |          |
| 2007/0005573 | A1 | * | 1/2007 | Murarka et al. | 707/3 |
| 2007/0271245 | A1 | * | 11/2007 | Repasi et al. | 707/3 |
| 2007/0276820 | A1 | * | 11/2007 | Iqbal     | 707/4   |
| 2008/0154912 | A1 |  | 6/2008  | Weber et al. | |
| 2008/0172364 | A1 |  | 7/2008  | Cucerzan et al. | |
| 2008/0307461 | A1 | * | 12/2008 | Tanikawa  | 725/53  |
| 2009/0043732 | A1 | * | 2/2009  | Lee       | 707/3   |
| 2009/0089257 | A1 | * | 4/2009  | Cho et al.| 707/3   |
| 2009/0157610 | A1 | * | 6/2009  | Allen et al. | 707/3 |
| 2009/0234811 | A1 |  | 9/2009  | Jamil et al. | |
| 2009/0293067 | A1 |  | 11/2009 | Singh et al. | |
| 2009/0313234 | A1 | * | 12/2009 | Takata et al. | 707/5 |
| 2010/0088254 | A1 | * | 4/2010  | Yang et al. | 706/11 |
| 2010/0178909 | A1 | * | 7/2010  | Kim et al. | 455/418 |
| 2010/0211454 | A1 | * | 8/2010  | Shin et al. | 705/14.42 |
| 2010/0268712 | A1 | * | 10/2010 | Ngwije    | 707/737 |
| 2010/0299589 | A1 | * | 11/2010 | Yamada    | 715/235 |
| 2010/0305983 | A1 | * | 12/2010 | De Marcken | 705/5 |
| 2010/0306051 | A1 | * | 12/2010 | Lee et al. | 705/14.49 |
| 2011/0015996 | A1 | * | 1/2011  | Kassoway et al. | 705/14.49 |
| 2011/0078192 | A1 | * | 3/2011  | Murdock, IV | 707/780 |
| 2011/0119270 | A1 | * | 5/2011  | Jin et al. | 707/737 |
| 2011/0131221 | A1 | * | 6/2011  | Bhide et al. | 707/755 |
| 2012/0066217 | A1 | * | 3/2012  | Eder       | 707/723 |

* cited by examiner

FOREIGN PATENT DOCUMENTS

WO    WO 02061609 A1 *  8/2002

OTHER PUBLICATIONS

Arias, et al., "ContextBased Personalization for Mobile Web Search", Retrieved at <<http://persdb08.stanford.edu/5-PersDB-Paper.pdf>>, Very Large Data Bases, VLDB '08, Aug. 24-30, 2008, pp. 7.

*Primary Examiner* — Frantz Coby

(57) ABSTRACT

Maintaining a plurality of search contexts and selecting one of the search contexts based on graphical properties of a user interface. Each of the search contexts is provided by and corresponds to one of a plurality of executing application programs. Responsive to an event, one of the search contexts is selected. In some embodiments, the search context provided by the application program having a window displayed in the foreground of the user interface is selected. Search results based on the selected search context are obtained and provided to the user.

20 Claims, 5 Drawing Sheets

QUERY CONTEXT SELECTION USING GRAPHICAL PROPERTIES

BACKGROUND

Search engines produce results based on search queries formulated by users. For example, if a user is viewing content and wants additional information, the user selects keywords and manually enters or pastes the keywords in an input box of a search engine. In other systems, search queries are formulated based on a scanned document, a web page, or a user's identity. Modern computing devices, however, simultaneously execute multiple application programs, each of which generates a different context.

SUMMARY

Embodiments of the disclosure enable pre-population of search queries. A plurality of search contexts is maintained. Each of the plurality of search contexts is associated with one of a plurality of application programs executing on a computing device. An event associated with the computing device is detected. One of the plurality of search contexts is identified responsive to the detected event. The identified search context is the search context that is created by the application program having a window displayed in a foreground of a user interface associated with the computing device. Search results based on the identified search context are obtained.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
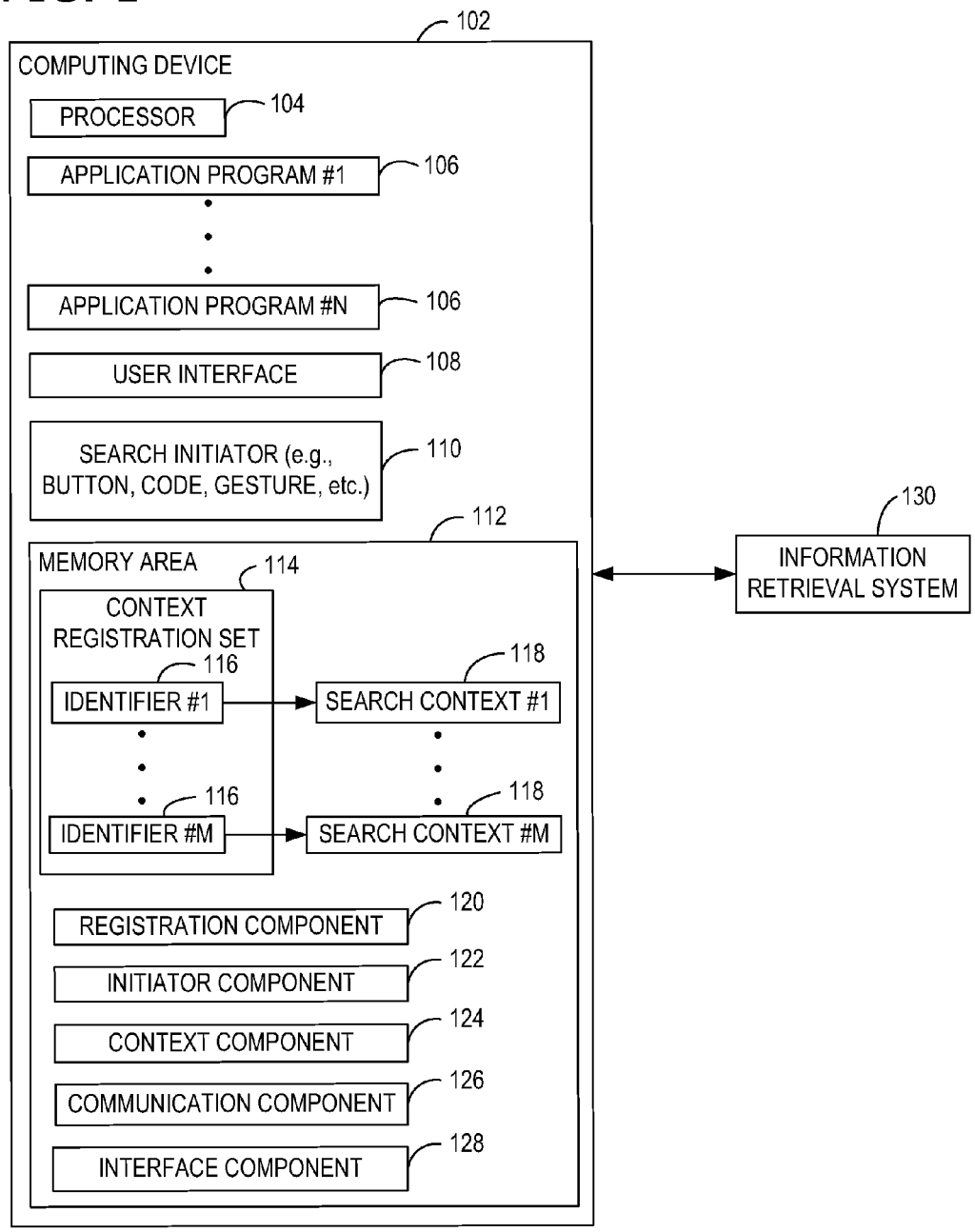
FIG. 1 is an exemplary block diagram illustrating a computing device maintaining a plurality of search contexts.

Referring to the figures, embodiments of the disclosure enable selection of search contexts 118 based on one or more graphical properties of a user interface 108 associated with a computing device 102. Each of a plurality of application programs 106 executing on the computing device 102 maintains one of the search contexts 118. Responsive to input from the user, one of the search contexts 118 is selected based on the graphical properties on the user interface 108. In some embodiments, the graphical properties include the relative position of the windows associated with the executing application programs 106. For example, the search context 118 corresponding to a window in the foreground of the user interface 108 is selected. In some embodiments, the foreground or currently active window is the window that is "on top" of other windows, is most visible to the user, and/or is currently affected by input from the user in the user interface 108. Search results associated with the selected search context 118 are obtained and presented to the user.

Aspects of the disclosure enable the application programs 106 to influence the outcome of a search initiated by the user. For example, a web browser can set the search context 118 based on user interactions and user input such as a browsing history or highlighted text from the user.

Referring again to FIG. 1, an exemplary block diagram illustrates the computing device 102 maintaining a plurality of search contexts 118. The computing device 102 includes, for example, any device executing instructions (e.g., application programs) to maintain the plurality of search contexts 118, select one of the search contexts 118, and obtain search results based on the selected search context 118. In some embodiments, the computing device 102 includes a portable computing device such as a mobile computing device (e.g., mobile telephone), laptop, netbook, gaming device, and/or portable media player. The computing device 102 may also include less portable devices such as desktop personal computers, kiosks, and tabletop devices. Further, the computing device 102 may represent a group of processing units or other computing devices.

The computing device 102 has at least one processor 104 and at least one user interface 108. The processor 104 includes any quantity of processing units, and is programmed to execute computer-executable instructions for implementing aspects of the disclosure. The instructions may be performed by the processor 104 or by multiple processors executing within the computing device 102, or performed by a processor external to the computing device 102. In some embodiments, the processor 104 is programmed to execute instructions such as those illustrated in the figures (e.g., FIG. 3 and FIG. 4).

The user interface 108 includes any interface for communicating with a user of the computing device 102. For example, the user interface 108 may provide content to the user visually (e.g., via a screen such as a touch screen), audibly (e.g., via a speaker), and/or via touch (e.g., vibrations or other movement from the computing device 102).

The computing device 102 further includes a search initiator 110. The search initiator 110 is a hardware-, firmware-, and/or software-based element for initiating communication with an information retrieval system 130 to obtain search results. In the example of FIG. 1, the information retrieval system 130 is remote from the computing device 102 and accessible by, for example, a network. The information retrieval system 130 includes any device capable of performing a search and providing the search results to the computing device 102.

The search initiator 110 includes any element or functionality capable of initiating the search. For example, the search initiator 110 includes a button, switch, alphanumeric code, numeric code, alphabetic code, input symbol or shape or other gesture, and/or pre-defined movement of the computing device 102. In a further example, the search initiator 110 activates responsive to a pre-defined sequence of button presses or key inputs on the computing device 102. In other examples, the search initiator 110 activates responsive to voice commands from the user. By providing a pre-defined input to the search initiator 110 (e.g., pressing the button, entering a code, etc.), the user activates the functionality of the search initiator 110.

In some embodiments, the search initiator 110 functionality is always-on, constantly accessible, or otherwise available to the user once an operating system 204 of the computing device 102 is available to execute user commands.

The computing device 102 further has one or more computer-readable media such as memory area 112. The memory area 112 includes any quantity of media associated with or accessible to the computing device 102. The memory area 112 may be internal to the computing device 102 (as shown in FIG. 1), external to the computing device 102 (not shown), or both (not shown).

The memory area 112 stores a context registration set 114. The context registration set 114 includes one or more identifiers 116 such as identifier #1 through identifier #M. Each of the identifiers 116 corresponds to one of the search contexts 118. The search contexts 118 include, for example, search context #1 through search context #M. Each of the search contexts 118 is created and/or provided by a corresponding one of the application programs 106. The computing device 102 executes, via the processor 104, one or more of the application programs 106 such as application program #1 through application program #N. The application programs 106 create each of the corresponding search contexts 118 explicitly and/or implicitly. Each of the application programs 106 maintains their own corresponding search context 118. In some embodiments, the application programs 106 obtain input from the user (e.g., the user highlights words or images or types in the words) and store portions of the input as the search context 118. For example, the user may explicitly enter the terms into an input portion of the application program 106. The application program 106 populates the search context 118 with the explicitly input terms. In some embodiments, the user does not explicitly intend for the input to be stored as the search context 118. Rather, the input merely represents an interaction between the user and the application program 106 that the application program 106 uses to populate the search context 118.

In other embodiments, the application programs 106 implicitly create the search contexts 118. For example, the application programs 106 may infer search terms based on user interaction with the application programs 106, user activity, and/or user preferences (e.g., as in a user profile). For example, the application programs 106 may create the search context 118 based on search terms derived from content being rendered or requested by the user (e.g., document being displayed, movie or images being displayed, song being played, etc.). The search terms may be derived from metadata or otherwise generated from the rendered content (e.g., the metadata associated with the media content such as album name, song title, performer name, etc.).

The memory area 112 further stores one or more computer-executable components for implementing aspects of the disclosure. In particular, exemplary components include a registration component 120, an initiator component 122, a context component 124, a communication component 126, and an interface component 128. The registration component 120, when executed by the processor 104, causes the processor 104 to identify the application programs 106 executing on the computing device 102 and to maintain the search contexts 118 for the identified application programs 106. For example, the registration component 120 maintains the search contexts 118 by storing one or more keywords generated from interaction between the user and the application programs 106. The initiator component 122, when executed by the processor 104, causes the processor 104 to detect an event associated with the computing device 102. The event includes, for example, an input from the user to the search initiator 110 (e.g., the user presses a button on the computing device 102).

The context component 124, when executed by the processor 104, causes the processor 104 to select one of the search contexts 118 maintained by the registration component 120. The selection occurs responsive to the event detected by the initiator component 122. The selected search context 118 is the one created by the application program 106 that has a window displayed in a foreground of the user interface 108 associated with the computing device 102. The communication component 126, when executed by the processor 104, causes the processor 104 to obtain search results based on the search context 118 selected by the context component 124. The interface component 128, when executed by the processor 104, causes the processor 104 to provide the search results to the user of the computing device 102. For example, the interface component 128 provides the search results in a window associated with the application program 106 whose search context 118 was selected by the context component 124.

In some embodiments, the registration component 120, the initiator component 122, the context component 124, the communication component 126, and the interface component 128 execute as part of an operating system associated with the computing device 102.

At least a portion of the functionality of the various elements in FIG. 1 may be performed by other elements in FIG. 1, or an entity (e.g., processor, web service, server, application program, computing device, etc.) not shown in FIG. 1.

Figure 2:
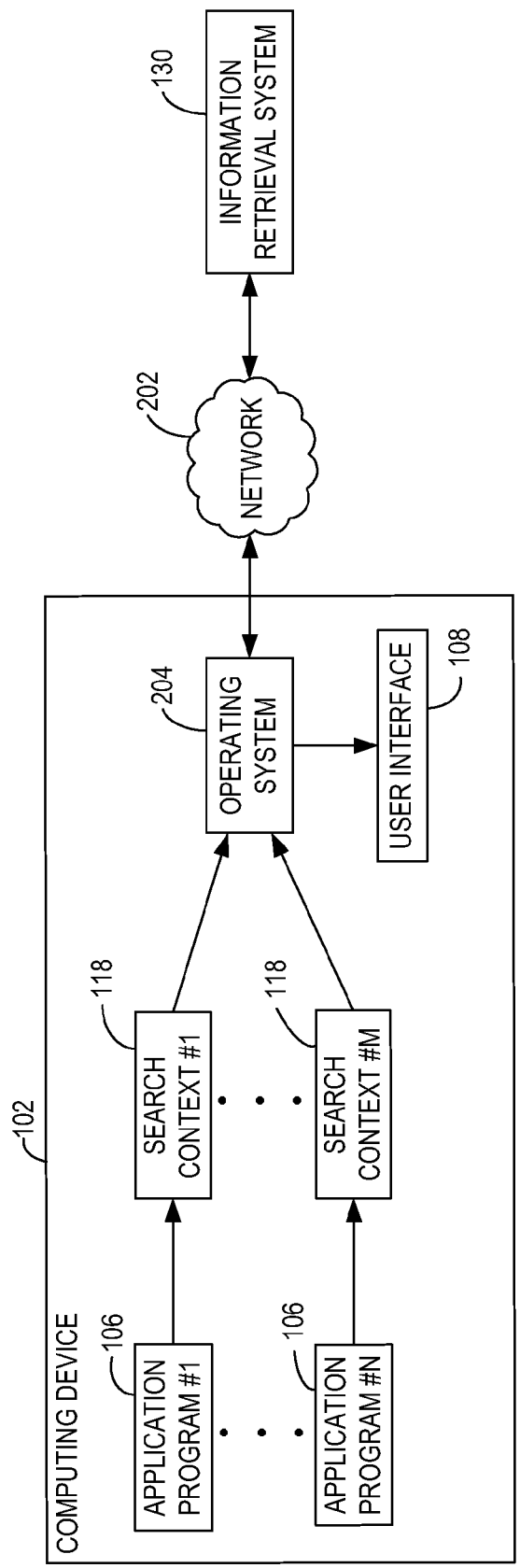
FIG. 2 is an exemplary block diagram illustrating the computing device executing application programs to populate search contexts.

Referring next to FIG. 2, an exemplary block diagram illustrates the computing device 102 executing the application programs 106 to populate the search contexts 118. Each of the application programs 106 registers with the operating system 204. Registration includes notifying the operating system 204 of the existence of the search context 118 that the registering application program 106 intends to populate. In some embodiments, registration further includes identifying the location of the search context 118. In other embodiments, the registering application program 106 provides the search context 118 to the operating system 204, and the operating system 204 stores the search context 118. In such embodiments, the operating system 204 may receive and store updated search context 118 from the registering application program 106 as updates become available. The operating system 204 updates the context registration set 114 with an identifier 116 associated with the newly registered search context 118. The identifier 116 may include, for example, the name of the corresponding application program 106, the location of the search context 118, the last modification date of the search context 118, the size of the search context 118, and/or other information the operating system 204 may use to locate the search context 118 and obtain data from the search context 118 when the search initiator 110 activates.

Each of the application programs 106 has a corresponding one of the search contexts 118. In the example of FIG. 2, the operating system 204 has logic for accessing the search contexts 118 when the search initiator 110 is activated. For example, when the user presses a button on the computing device 102, the operating system 204 detects the button press and determines which executing application program 106 has a window displayed in the foreground of the user interface 108. For example, the operating system 204 selects, from the context registration set 114 stored in the memory area 112, the identifier 116 corresponding to the search context 118 associated with the application program 106 having the foreground window in the user interface 108. The operating system 204 then obtains the search context 118 corresponding to the determined application program 106, and provides the obtained search context 118 (or a portion thereof) to the information retrieval system 130 via a network 202. For example, the operating system 204 provides data representing the obtained search context 118. The data may include the obtained search context 118 in its entirety, a portion of the obtained search context 118, and/or data generated from the obtained search context 118 (e.g., synonyms). The information retrieval system 130 (e.g., a search engine) performs a search on the provided search context 118 and returns search results to the computing device 102. The computing device 102 provides the search results to the user of the computing device 102.

In some embodiments (not shown), the information retrieval system 130 is located "on-device" or otherwise associated with the computing device 102. In such embodiments, the network 202 is not accessed during operation of the disclosure.

Figure 3:
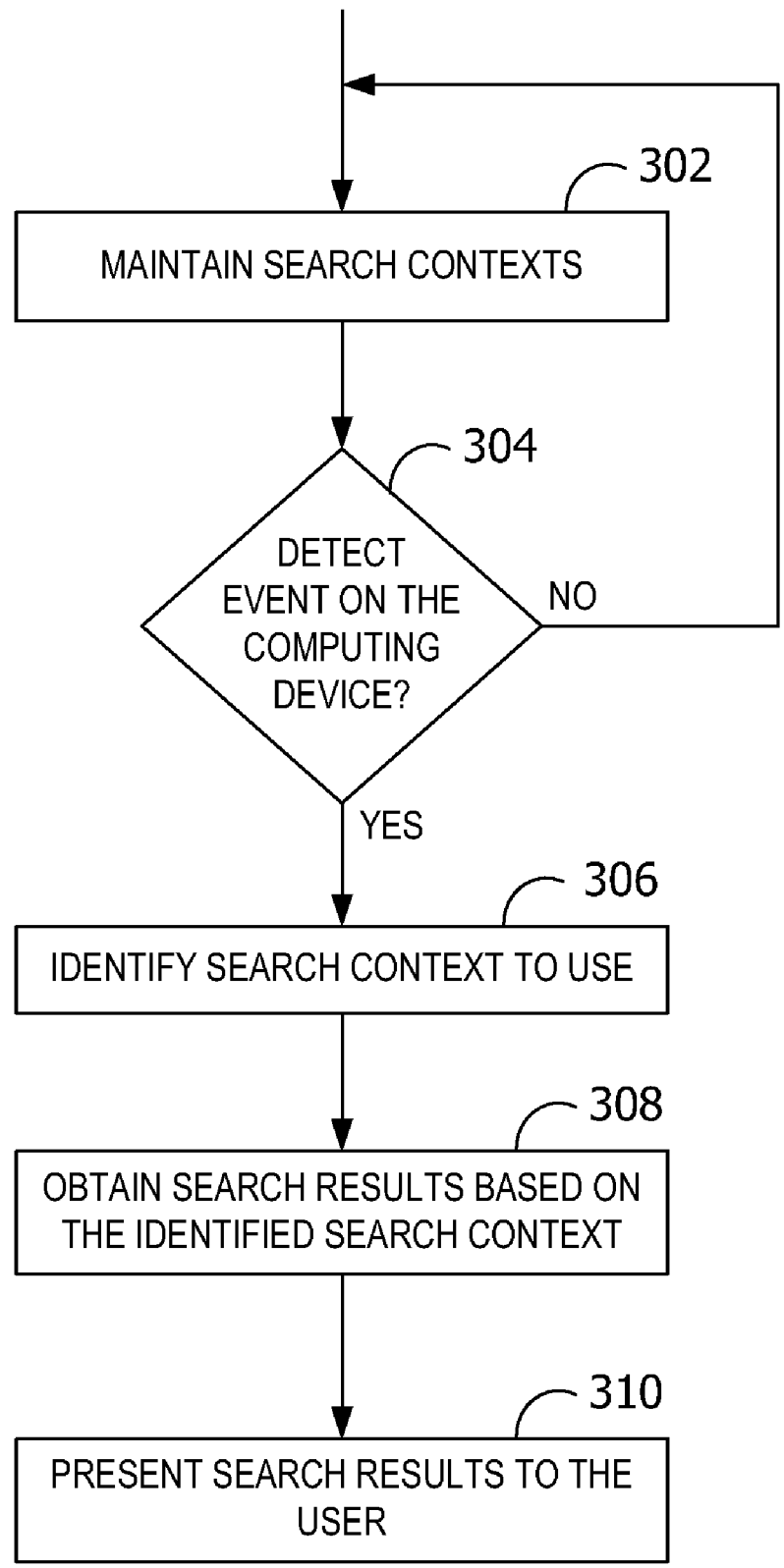
FIG. 3 is an exemplary flow chart illustrating operation of a computing device to select a search context and obtain search results based on the selected search context.

Referring next to FIG. 3, an exemplary flow chart illustrates operation of the computing device 102 to select one of the search contexts 118 and to obtain search results based on the selected search context 118. The plurality of search contexts 118 is maintained at 302. Each of the plurality of search contexts 118 is associated with one of the plurality of application programs 106 executing on the computing device 102. The computing device 102 monitors the search initiator 110 to detect any events. For example, the computing device 102 may detect an event by detecting one or more of the following: a button press, a gesture, an alphabetic code, a numeric code, and an alphanumeric code. The computing device 102 may further detect events by detecting a predefined movement of the computing device 102. In a time-based embodiments, an event may occur upon expiration of a timer. In such embodiments, operations 306, 308, and 310 may be performed at regular intervals.

If an event is detected at 304, one of the search contexts 118 is identified at 306. For example, the search context 118 associated with the window in the foreground of the user interface 108 at the time of event detection is identified. Search results based on the identified search context 118 are obtained at 308. For example, the computing device 102 provides the search context 118, or a portion thereof, to a search engine and receives search results from the search engine.

The search results are presented to the user of the computing device 102 at 310. The search results may be presented in a window of the application program 106 whose search context 118 was identified at 306. In such embodiments, the application program 106 may include branding content associated with the application program 106. For example, the application program 106 may frame the search results with banner advertisements including the name of the application program 106.

In other embodiments, the search results are provided to the user in a window separate, or not associated with, the application program 106 whose search context 118 was identified at 306. In such embodiments, the search results may be displayed, for example, in a dedicated "search results" window.

In some embodiments, the operations illustrated in FIG. 3 are performed by the computing device 102. In other embodiments, one or more of the operations illustrated in FIG. 3 are performed by another computing device (e.g., as a web service). Further, the operations illustrated in FIG. 3 may be implemented as software instructions encoded on a computer-readable medium, in hardware programmed or designed to perform the operations, or both.

Figure 4:
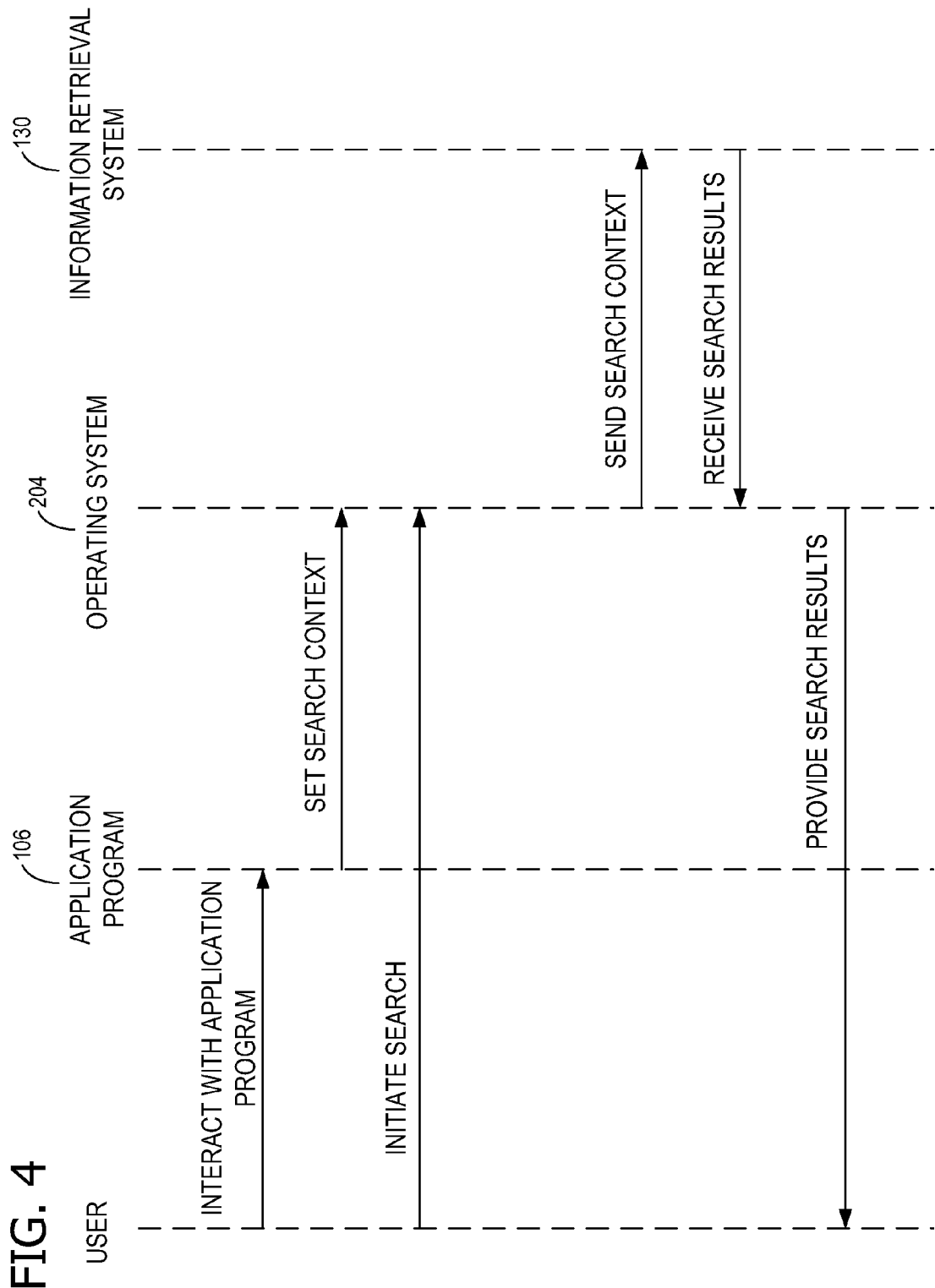
FIG. 4 is an exemplary sequence diagram illustrating interaction among the user, an application program, an operating system, and an information retrieval system.

Referring next to FIG. 4, an exemplary sequence diagram illustrates interaction among the user, one of the application programs 106, the operating system 204 executing on the computing device 102, and the information retrieval system 130. The user interacts with the application program 106, which has a window in the foreground of the user interface 108. The application program 106 monitors the user interaction, and creates or sets the search context 118 (e.g., implicitly or explicitly from the user). The user initiates the search (e.g., by pressing a button or other input as described herein and within the scope of the disclosure). Responsive to the search initiator 110, the operating system 204 determines which application program 106 has a window in the foreground of the user interface 108 of the computing device 102. The operating system 204 obtains the search context 118 for that application program 106 and sends the obtained search context 118 to the information retrieval system 130. The operating system 204 receives the search results from the information retrieval system 130 and provides the search results to the user (e.g., via the application program 106, or separate from the application program 106).

Figure 5:
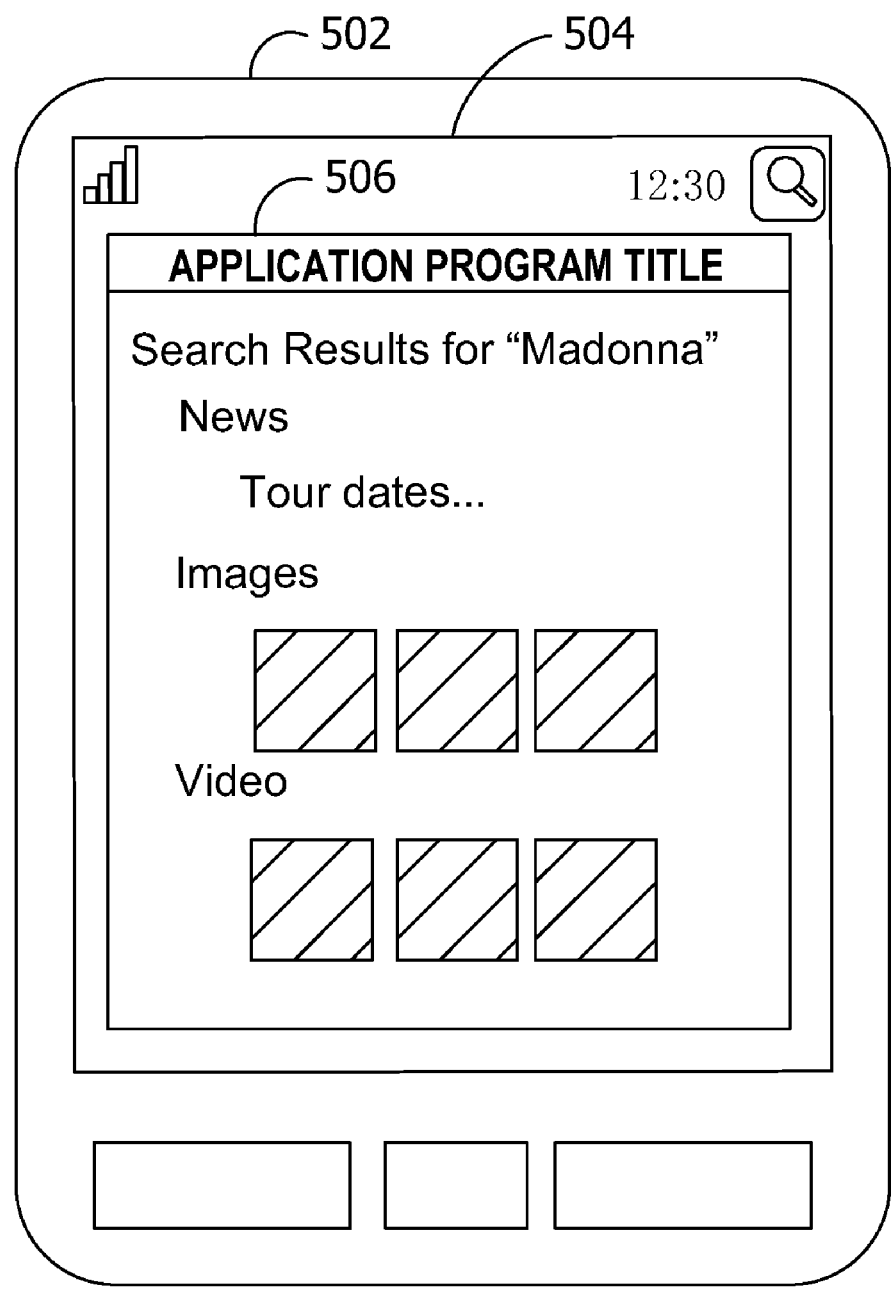
FIG. 5 is an exemplary mobile computing device illustrating search results displayed in a user interface.

Referring next to FIG. 5, an exemplary mobile computing device 502 illustrates search results displayed in a user interface 504. The application program 106 having the foreground window 506 is a media application playing a song by a particular performer. The media application populated the search context 118 with the name of the performer and possibly other relevant information. Upon a button press or other search initiator 110 from the user, the operating system 204 identifies the media application as having the foreground window 506, obtains the search context 118 associated with the media application, obtains search results, and provides the search results to the media application. The search results include news, images, and video of the performer. The media application includes the branded content "APPLICATION PROGRAM TITLE" in a frame above the search results in the foreground window 506.

ADDITIONAL EXAMPLES

In some embodiments, the computing device 102 includes a search results user interface, or a portion of the user interface 108, dedicated to displaying the search results. For example, the search results user interface may be on the backside of the computing device 102, or may be the bottom 10% of the user interface 108. In such embodiments, the operating system 204 may obtain the search results at pre-defined intervals or responsive to pre-defined events. For example, search results may be obtained every time a new song is played so long as the window of the application program 106 playing the song is in the foreground. When the user switches another window to the foreground, the search results user interface displays search results based on the search context 118 of the application programs 106 having the foreground window.

In one example, the user of a mobile telephone uses a camera application to take a picture of a wine bottle, and the camera application populates its corresponding search context 118 with search terms derived or obtained from the picture (e.g., name of winery, vintage, size of bottle, etc.). The user then presses a button on the mobile telephone to activate the search initiator 110. The operating system 204 determines that the window of the camera application is in the foreground, obtains the search context 118 of the camera application, obtains search results based on the search context 118, and provides the search results to the user. In this example, the search results may include a review of the wine, comparison prices, etc.

In a further example, the user takes a picture of a business establishment to obtain information about the business (e.g., hours of operation, current promotions, etc.).

While embodiments have been described with reference to data collected from users, aspects of the disclosure provide notice to the users of the collection of the data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for pre-population of search queries on the mobile computing device and exemplary means for initiating searches based on the search contexts 118.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for pre-population of search queries, said system comprising:
   a memory area associated with a mobile computing device, said memory area storing a context registration set including one or more identifiers, each of said identifiers being associated with one of a plurality of search contexts, each of the plurality of search contexts being created by one of a plurality of application programs executing on the mobile computing device; and
   a processor programmed to:
   detect an event associated with the mobile computing device;
   select, from the context registration set stored in the memory area, one of the identifiers responsive to the detected event, said one of the identifiers being associated with the search context created by the application program having a window displayed in a foreground of a user interface associated with the mobile computing device;
   provide data representing the search context associated with the selected identifier to an information retrieval system, wherein the information retrieval system obtains search results based on the provided data;
   receive the search results from the information retrieval system; and
   provide the received search results to a user of the mobile computing device.

2. The system of claim 1, wherein the processor is further programmed to:
   receive notification of execution of another application program on the mobile computing device;
   determine an identifier associated with a search context for the application program; and
   update the context registration set with the determined identifier.

3. The system of claim 1, wherein the search context comprises an implicit search context, said implicit search context including data describing user activity and/or user preferences.

4. The system of claim 1, wherein the search context comprises an explicit search context, said explicit search context including data input into the mobile computing device by a user.

5. The system of claim 1, wherein each of the search contexts is associated with one of a plurality of application programs executing on the mobile computing device, and wherein the processor is programmed to select said at least one of the identifiers by identifying one of the plurality of application programs having a window displayed in a foreground of a user interface associated with the mobile computing device.

6. The system of claim 1, wherein each of the search contexts is associated with one of a plurality of windows displayed in a user interface associated with the mobile computing device, and wherein the processor is programmed to select said at least one of the identifiers by identifying one of the plurality of windows displayed in a foreground of the user interface.

7. The system of claim 1, further comprising means for pre-population of search queries on the mobile computing device.

8. The system of claim 1, further comprising means for initiating searches based on the search contexts.

9. A method comprising:
maintaining a plurality of search contexts, each of the plurality of search contexts being associated with one of a plurality of application programs executing on a computing device;
detecting an event associated with the computing device;
identifying one of the plurality of search contexts responsive to the detected event, wherein the identified search context is created by the application program having a window displayed in a foreground of a user interface associated with the computing device; and
obtaining search results based on the identified search context.

10. The method of claim 9, further comprising providing the obtained search results to a user of the computing device.

11. The method of claim 9, wherein detecting the event comprises detecting one or more of the following: a button press, a gesture, an alphabetic code, a numeric code, and an alphanumeric code.

12. The method of claim 9, wherein detecting the event comprises detecting one or more of the following: a pre-defined movement of the computing device, and expiration of a timer.

13. The method of claim 9, wherein maintaining the plurality of search contexts, detecting the event, identifying said one of the plurality of search contexts, and obtaining the search results are performed by an operating system associated with the computing device.

14. The method of claim 9, wherein obtaining the search results comprises:
providing the identified search context to a search engine; and
receiving the search results from the search engine.

15. The method of claim 9, wherein identifying said one of the plurality of search contexts comprises identifying one of the application programs having a window displayed in a foreground of a user interface associated with the computing device.

16. The method of claim 15, further comprising providing the obtained search results to a user of the computing device in a user interface not associated with the identified application program.

17. The method of claim 15, further comprising:
providing the obtained search results to a user of the computing device in a user interface associated with the identified application program; and
providing co-branding content for display in the user interface, said co-branding content being associated with the identified application program.

18. One or more computer-readable media having computer-executable components, said components comprising:
a registration component that when executed by at least one processor causes the at least one processor to identify application programs executing on a computing device and to maintain search contexts for the identified application programs;
an initiator component that when executed by at least one processor causes the at least one processor to detect an event associated with the computing device;
a context component that when executed by at least one processor causes the at least one processor to select, responsive to the event detected by the initiator component, one of the search contexts maintained by the registration component, wherein the selected search context is created by the application program having a window displayed in a foreground of a user interface associated with the computing device;
a communication component that when executed by at least one processor causes the at least one processor to obtain search results based on the search context selected by the context component; and
an interface component that when executed by at least one processor causes the at least one processor to provide, to a user of the computing device, the search results obtained by the communication component.

19. The computer-readable media of claim 18, wherein the selected search context is associated with one of the application programs, and wherein the registration component maintains the search contexts by storing one or more keywords generated from interaction by the user with said one of the application programs.

20. The computer-readable media of claim 18, wherein the selected search context is associated with one of the application programs, and wherein the interface component provides the search results in a window associated with said one of the application programs.

* * * * *